US 9,341,876 B2

(12) United States Patent
Sato

(10) Patent No.: US 9,341,876 B2
(45) Date of Patent: May 17, 2016

(54) LIQUID CRYSTAL DISPLAY DEVICE

(71) Applicant: Japan Display Inc., Tokyo (JP)

(72) Inventor: Daisuke Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/508,415

(22) Filed: Oct. 7, 2014

(65) Prior Publication Data

US 2015/0098030 A1   Apr. 9, 2015

(30) Foreign Application Priority Data

Oct. 8, 2013   (JP) .................................. 2013-211330

(51) Int. Cl.
*G02F 1/1333*   (2006.01)

(52) U.S. Cl.
CPC ...... *G02F 1/133308* (2013.01); *G02F 1/13338* (2013.01); *G02F 2001/13332* (2013.01); *G02F 2001/133317* (2013.01)

(58) Field of Classification Search
CPC .......... G02F 2001/133317; G02F 2001/13332; G02F 1/13338
See application file for complete search history.

(56) References Cited

U.S. PATENT DOCUMENTS

2007/0241993 A1*  10/2007  Monden ............ G02F 1/133308
                                                                      345/58
2008/0055513 A1    3/2008   Ichio

FOREIGN PATENT DOCUMENTS

| JP | 2007-286396 A | 11/2007 |
| JP | 2008-58439 A | 3/2008 |
| JP | 2009-69335 A | 4/2009 |
| JP | 2014-115588 A | 6/2014 |

* cited by examiner

*Primary Examiner* — Wen-Ying P Chen
(74) *Attorney, Agent, or Firm* — Typha IP LLC

(57) ABSTRACT

A liquid crystal display device capable of reducing or preventing display irregularities is provided. In the liquid crystal display device including: an upper frame, a lower frame, a BL resin frame and a liquid crystal display panel and used as a display part as incorporated in an equipment, the liquid crystal display panel is fixed by the upper frame (fixation area). The BL resin frame includes BL resin frame ribs serving as a receiving part to receive a fixing device for fixing the liquid crystal display device to the equipment.

12 Claims, 4 Drawing Sheets

F I G . 3
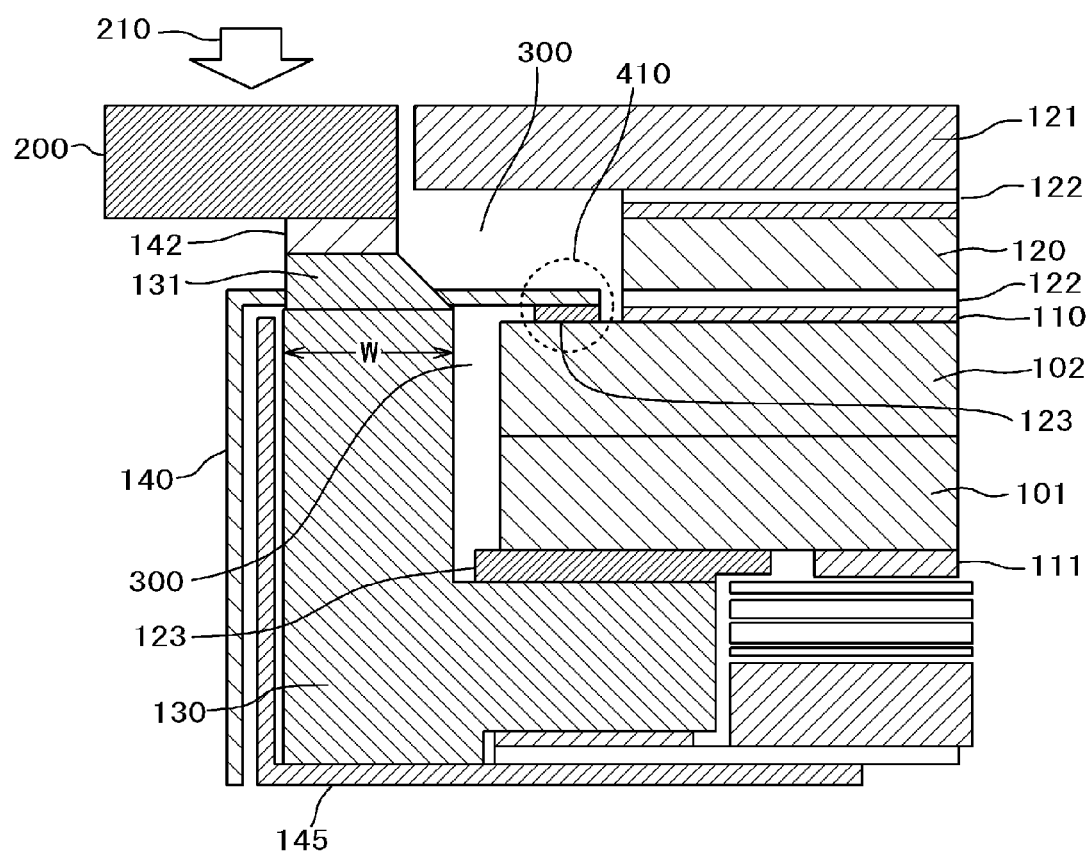

LIQUID CRYSTAL DISPLAY DEVICE

CLAIM OF PRIORITY

The present application claims priority from Japanese patent application JP 2013-211330 filed on Oct. 8, 2013 the content of which is hereby incorporated by reference into this application.

BACKGROUND OF THE INVENTION

1. Field of the Invention

The present invention relates to a liquid crystal display device for use as a display part as incorporated in an equipment.

2. Description of the Prior Art

Currently, the liquid crystal display devices are widely used as the display part of cellular phones, digital cameras and the like. A liquid crystal display panel of the liquid crystal display device includes two transparent substrates and a liquid crystal layer sandwiched therebetween. This liquid crystal display panel has a drawback in that its display quality is adversely affected when subjected to any external force.

SUMMARY OF INVENTION

There is provided a liquid crystal display module that ensures display quality unaffected by the external force applied thereto. For this purpose, Japanese Unexamined Patent Application Publication No. 2008-58439 discloses a liquid crystal display module which includes: a liquid crystal display panel; a light guide plate and a mold disposed on a back side of the liquid crystal display panel; a lower metal frame disposed on the side of the light guide plate and mold; and an upper metal frame disposed on the side of the liquid crystal display panel, and in which the lower frame has a greater thickness than that of the upper frame.

There is provided a liquid crystal display device adapted to prevent the liquid crystal panel from being broken as clamped between a middle frame and a front frame during the assembly of the liquid crystal display device, and a liquid crystal display device having the above-described function and capable of maintaining a retention force for the liquid crystal panel even in the case of low-profile design of the liquid crystal display device. For this purpose, Japanese Unexamined Patent Application Publication No. 2007-286396 discloses a liquid crystal display device having the following structure. A front frame 13 includes a panel opening part OP defined by a portion facing a display surface of a liquid crystal display panel 9. At a casing portion corresponding to a frame portion around the opening part OP, two sides parallel to a lateral direction of the panel and two side parallel to a longitudinal direction of the panel are each formed with two through-holes 13a. Each of the through-holes 13a has an oval shape, the major axis of which coincides with a direction in which each side extends. Panel guide portions 7a as parts of a middle frame 7 disposed under the front frame 13 are externally visible within a relatively wide range.

Further, there is provided an electro-optic device adapted to prevent frame distortion caused by external pressing force and occurrence of cracks in the display panel. For this purpose, Japanese Unexamined Patent Application Publication No. 2009-69335 discloses an electro-optic device which includes a display panel and a frame. The frame is integrally formed of a metal frame and resin. A lateral side of the metal frame includes a protrusion protruded from the resin and exposed on a display surface of the display panel.

As shown in FIG. 1, the inventors have incorporated a liquid crystal display device into an actual equipment such as a digital camera. The liquid crystal display device includes a liquid crystal display panel which includes a TFT substrate 101 and a CF substrate 102 laminated to each other with liquid crystal (not shown) interposed therebetween. The TFT substrate includes a driver circuit and TFTs and the like formed for individual pixels while the CF substrate includes a color filter and the like. The liquid crystal display panel is fixed in position by a backlight (BL) retaining resin frame 130 disposed in a lower frame (made of metal) 145 and an upper frame (made of metal) 140. The liquid crystal display device shown in FIG. 1 is characterized in that a top surface of the BL resin frame 130 is positioned lower than a bottom surface of the upper frame 140 such as to prevent separation of a double-sided adhesive tape 123 interposed between the upper frame 140 and the liquid crystal display panel (herein, the CF substrate 102). It is noted that reference numeral 200 denotes a fixing device (back cover) which is provided at an equipment, such as a digital camera, for fixing the liquid crystal panel to the actual equipment; reference numeral 210 denotes a direction in which the force is applied to the back cover; reference numeral 110 denotes an upper polarizing plate; reference numeral 111 denotes a lower polarizing plate; reference numeral 120 denotes a touch panel; reference numeral 121 denotes a glass protective plate; reference numeral 122 denotes a UV-cured resin sheet or adhesive sheet; reference numeral 123 denotes the double-sided adhesive tape; reference numeral 142 denotes a cushion material; reference numeral 300 denotes a gap; and reference numeral 410 denotes fixation (adhesion area) between the upper frame and the liquid crystal display panel. A backlight, a light guide plate, a reflective sheet, an optical compensation sheet and the like are retained by the lower frame via the BL resin frame 130.

When the liquid crystal display device shown in FIG. 1 was incorporated in the actual equipment, display irregularities (a phenomenon that the screen looks whitish) were observed at the periphery of the liquid crystal display panel. The display irregularities are negligible, posing little problem for the current products. From the standpoint of higher definition panel, however, the inventors considered that this drawback should be removed in future.

An object of the invention is to provide a liquid crystal display device which can reduce or prevent the display irregularities even when the display device is incorporated in an equipment and used as a display part.

According to an aspect of the invention, a liquid crystal display device includes: an upper frame including a top side part having a display opening, and a lateral side part; a lower frame disposed under the upper frame and including a bottom side part and a lateral side part; a backlight retaining resin frame disposed between the upper frame and the lower frame; and a liquid crystal display panel disposed inside the resin frame, and is used as a display part as incorporated in an equipment, the liquid crystal display device having a structure wherein the liquid crystal display panel is fixed by the upper frame, the upper frame includes a plurality of openings in the top side part thereof, the resin frame includes resin frame ribs protruded from the plural openings, respectively, and the resin frame ribs are a receiving part to receive a fixing device for fixing the liquid crystal display device to the equipment.

According to another aspect of the invention, a liquid crystal display device includes: an upper frame including a top side part having a display opening, and a lateral side part; a lower frame disposed under the upper frame and including a bottom side part and a lateral side part; a backlight retaining resin frame disposed between the upper frame and the lower frame; and a liquid crystal display panel disposed inside the resin frame, and is used as a display part as incorporated in an equipment, the liquid crystal display device having a structure wherein the liquid crystal display panel has a laminate structure where a TFT substrate having TFTs formed thereon, a CF substrate having a color filter formed thereon, a touch panel and a glass protective plate are laminated in this order, and has the CF substrate fixed by the upper frame, the upper frame includes a plurality of openings in the top side part thereof, the resin frame includes resin frame ribs protruded from the plural openings, respectively, and the resin frame rib includes: a receiving part to receive a fixing device for fixing the liquid crystal display device to the equipment; and a receiving part to receive the glass protective plate.

The present invention can provide the liquid crystal display device capable of reducing or preventing the display irregularities even when incorporated in the equipment and used as the display part.

BRIEF DESCRIPTION OF THE DRAWINGS

FIG. 3 is a schematic sectional view of a main part of a liquid crystal display device according to a first embodiment of the invention (as taken on the line A-A' in FIG. 2)

DESCRIPTION OF THE PREFERRED EMBODIMENTS

Figure 1:
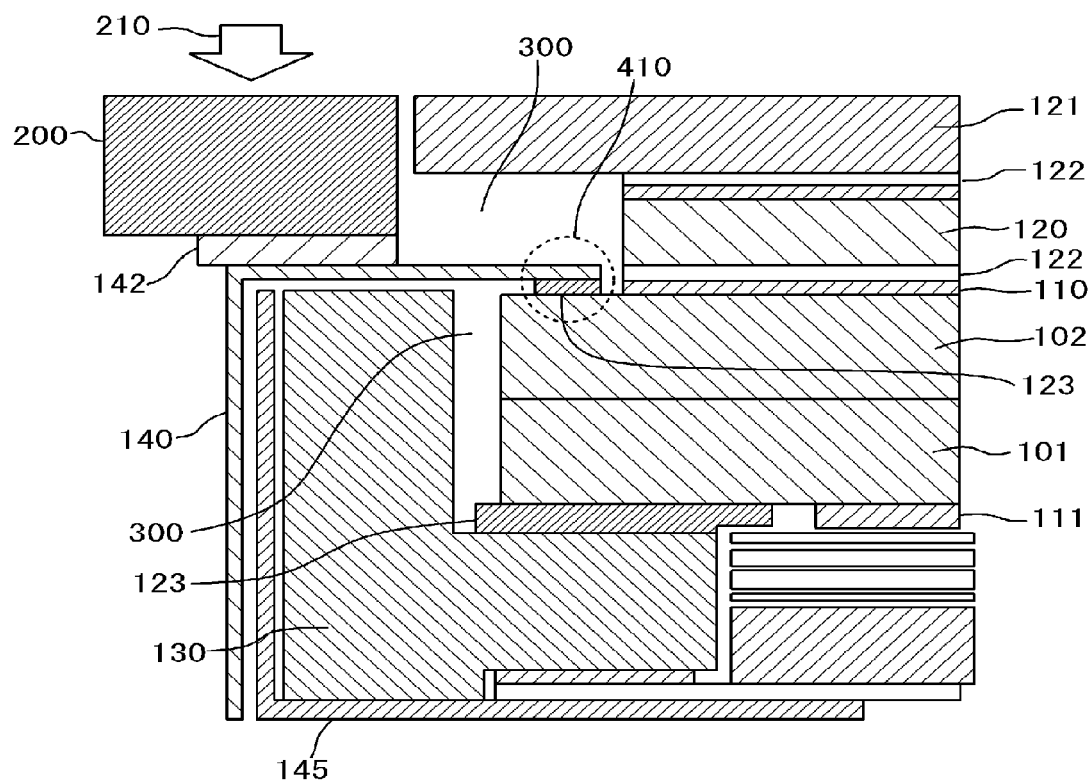
FIG. 1 is a schematic sectional view of a main part of a liquid crystal display device examined by the inventors.

The inventors have examined the cause of the display irregularities (the phenomenon that the screen looks whitish) generated at the periphery of the liquid crystal display panel when the liquid crystal display device is incorporated into the actual equipment. The liquid crystal display device is equipped with upper and lower frames and includes a laminate of a touch panel and a glass protective plate, as shown in FIG. 1. As a result, the followings are found. An upper frame 140 is pressed down by a force applied to a back cover 200 in an arrowed direction 210 to close the back cover 200 which is disposed at the actual equipment such as to fix the liquid crystal display panel to the actual equipment. Hence, the upper frame 140 is flexed by an amount corresponding to a clearance between a bottom surface of the upper frame 140 and a top surface of a BL resin frame 130, thus compressing the liquid crystal display panel (CF substrate 102) fixed to the upper frame 140 with a double-sided adhesive tape 123. A cushion material 142 disposed between the back cover 200 of the actual equipment and the upper frame 140 is almost completely crushed, failing to function as the cushion material. Consequently, the liquid crystal display panel is deformed to produce cell gap which induces display irregularities at the periphery of a display region. The present invention has been accomplished based on the above findings and provides a structure which prevents the back cover 200 of the actual equipment from depressing the upper frame.

The invention will hereinbelow be described with reference to the embodiments thereof. In the figures, like reference numerals refer to the corresponding components.

First Embodiment

Figure 2:
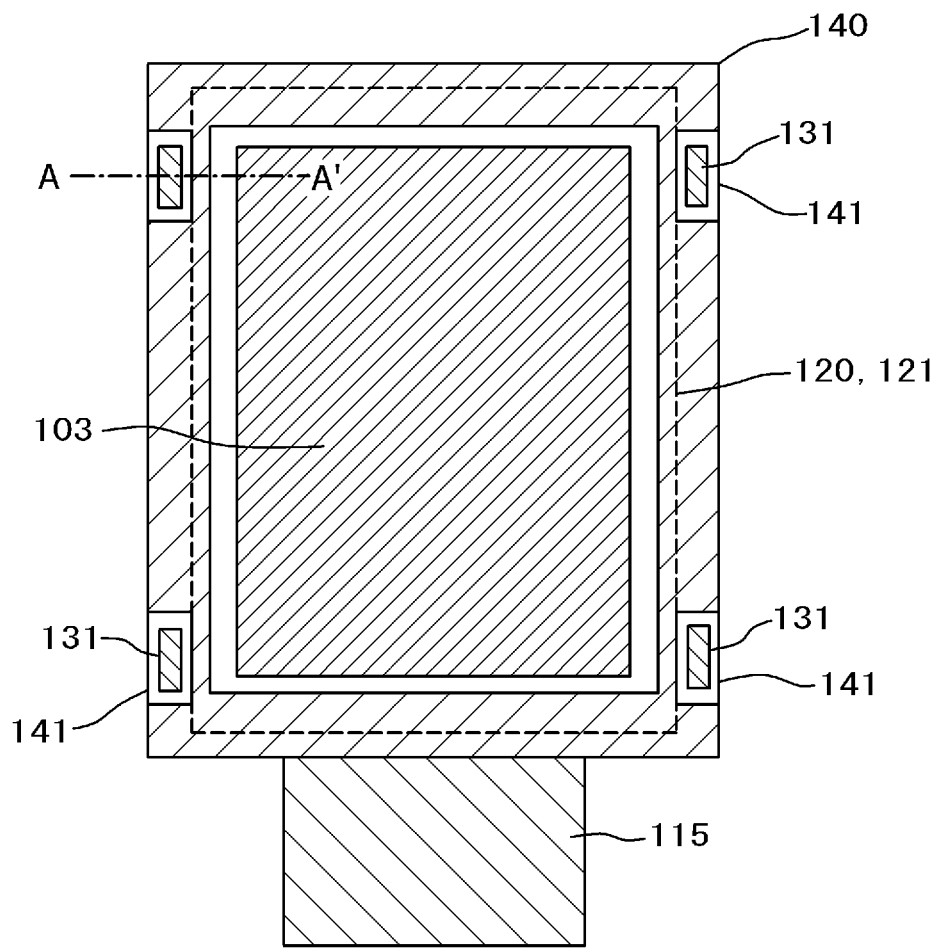
FIG. 2 is a schematic plan view of a liquid crystal display device according to each embodiment of the invention.

A first embodiment of the invention is described with reference to FIG. 2 and FIG. 3. FIG. 2 is a schematic plan view of a liquid crystal display device 100 according to the embodiment of the invention. FIG. 3 is a schematic sectional view taken on the line A-A' in FIG. 2. In this embodiment, the BL resin frame 130 is provided with BL resin frame ribs 131 while the upper frame 140 is provided with openings (upper frame openings) 141 at places corresponding to the BL resin frame ribs 131, as shown in FIG. 2. It is noted that the structure where the liquid crystal display panel including the TFT substrate 101 and the CF substrate 102 is fixed to the upper frame 140 and the BL resin frame by means of the double-sided adhesive tape 123 is unchanged. For the purpose of preventing the separation of the double-sided adhesive tape 123 interposed between the upper frame 140 and the liquid crystal display panel (herein, the CF substrate 102), the top surface of the resin frame at a region free of the resin frame ribs may preferably define a clearance with respect to the bottom surface of a top side part of the upper frame. In FIG. 2, reference numeral 103 denotes a display region while reference numeral 115 denotes a FPC (Flexible Printed Circuit) board. The liquid crystal display panel includes a touch panel 120 and a protective plate 121. In this embodiment, a glass plate is used as the protective plate 121. Besides the glass plate, plates of other materials such as plastics are usable. However, the glass plate is more preferred.

The BL resin frame ribs 131 protrude from the openings 141 of the upper frame 140 to a level higher than a top surface of the top side part of the upper frame 140. The back cover (fixing device) 200 of the actual equipment is received by the BL resin frame ribs (receiving part) 131 so that the upper frame 140 is not pressed down, the liquid crystal display panel is not deformed, the cell gap is not produced, or the display irregularities do not occur at the periphery of the display region. In order to receive the force from the back cover 200, the BL resin frame ribs 131 may preferably have a trapezoidal configuration (tapered configuration) which has a flat top surface and a minimum width equal to or more than ½ of the width W of the BL resin frame and in which the width is progressively decreased with increase in height. It is desirable to avoid a reverse tapered configuration. Further, the BL resin frame ribs 131 may preferably be arranged in a line symmetrical form with respect to a center line extending in a longitudinal direction (vertical direction as seen in FIG. 2) of the liquid crystal display device. Further, the BL resin frame ribs 131 may preferably have the flat top surface.

As described above, this embodiment can provide the liquid crystal display device which is capable of reducing or preventing the display irregularities even when incorporated in the equipment and used as the display part.

Second Embodiment

Figure 4:
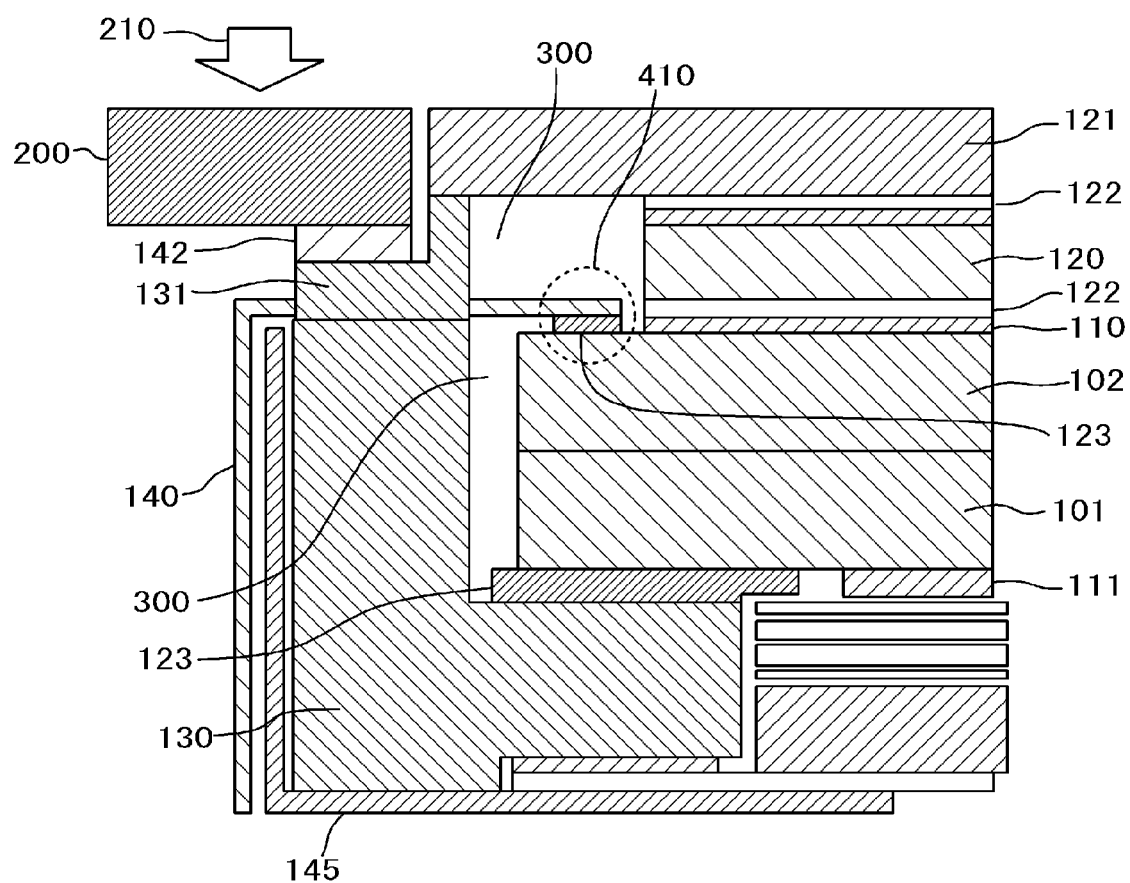
FIG. 4 is a schematic sectional view of a main part of a liquid crystal display device according to a second embodiment of the invention (as taken on the line A-A' in FIG. 2).

A second embodiment of the invention is described with reference to FIG. 2 and FIG. 4. FIG. 4 is a schematic sectional view taken on the line A-A' in FIG. 2. It is to be noted that the features described in the first embodiment but not in this embodiment can also be applied to this embodiment unless otherwise noted.

In this embodiment, the BL resin frame 130 is provided with the BL resin frame ribs 131 while, as shown in FIG. 2, the upper frame 140 is provided with the openings (upper frame openings) 141 at places corresponding to the BL resin frame ribs 131. It is noted that the structure where the liquid crystal display panel including the TFT substrate 101 and the CF substrate 102 is fixed to the upper frame 140 and the BL resin frame by means of the double-sided adhesive tape 123 is unchanged. For the purpose of preventing the separation of the double-sided adhesive tape 123 interposed between the upper frame 140 and the liquid crystal display panel (herein, the CF substrate 102), the top surface of the resin frame at the region free of the resin frame ribs may preferably define the clearance with respect to the bottom surface of the top side part of the upper frame.

The BL resin frame rib 131 protrudes from the opening 141 of the upper frame 140 to the level higher than the top surface of the top side part of the upper frame 140. Further, the BL resin frame rib is formed with a part to receive the back cover of the actual equipment and a part to receive the glass protective plate 121. By including the part to receive the back cover 200, the BL resin frame rib 131 is adapted to receive the force applied to the back cover of the actual equipment so that the upper frame 140 is not pressed down, the liquid crystal display panel is not deformed, the cell gap is not produced, or the display irregularities do not occur at the periphery of the display region. By including the part to receive the glass protective plate 121, the BL resin frame rib 131 is adapted to reduce or prevent the breakage of the glass protective plate 121 even when an external force is applied to an end of the glass protective plate 121, and to reduce or prevent the deformation of the liquid crystal display panel or the variation of the cell gap when the glass protective plate 121 is pressed. In the BL resin frame rib 131, the part to receive the glass protective plate 121 may preferably be at such a height as to make contact with a bottom surface of the glass protective plate or slightly lower than such a height. It is noted here that the term "slightly" means more or less the range of production tolerance. Further, the BL resin frame ribs 131 may preferably be arranged in line symmetry with respect to the center line extending in the longitudinal direction (vertical direction as seen in FIG. 2) of the liquid crystal display device. Further, the part to receive the back cover of the actual equipment may preferably have a greater width than that of the part to receive the glass protective plate. Each of the BL resin frame ribs 131 may preferably have the flat top surface.

As described above, this embodiment can provide the liquid crystal display device which is capable of reducing or preventing the display irregularities even when incorporated in the equipment and used as the display part. By including the part to receive the glass protective plate as well as the part to receive the back cover of the actual equipment, the BL frame ribs are adapted to reduce or prevent the breakage of the glass protective plate and to reduce or prevent the deformation of the liquid crystal display panel and the variation of the cell gap.

It is to be noted that the present invention is not limited to the above-described embodiments but includes various modifications. The above embodiments, for example, are specifically described to clarify the present invention, which is not necessarily limited to what includes all the described features. It is also possible to replace a part of the structure of one embodiment with a part of the structure of another embodiment. It is also possible that the structure of one embodiment additionally includes a structure of another embodiment. A part of the structure of each embodiment permits omission, or addition of or replacement with a feature of another structure.

What is claimed is:

1. A liquid crystal display device comprising: an upper frame including a top side part having a display opening, and a lateral side part; a lower frame disposed under the upper frame and including a bottom side part and a lateral side part; a backlight retaining resin frame disposed between the upper frame and the lower frame; and a liquid crystal display panel disposed inside the resin frame, and used as a display part as incorporated in an equipment,
    wherein the liquid crystal display panel is fixed by the upper frame,
    the upper frame includes a plurality of openings in the top side part thereof,
    the resin frame includes resin frame ribs protruded from the plural openings, respectively, and
    the resin frame ribs are a receiving part to receive a fixing device for fixing the liquid crystal display device to the equipment.

2. The liquid crystal display device according to claim 1, wherein the minimum width of the resin frame rib is equal to or more than ½ of the width of the resin frame along a side wall part of the lower frame.

3. The liquid crystal display device according to claim 2, wherein the resin frame rib has a tapered configuration where a top surface of the resin frame rib has the minimum width.

4. The liquid crystal display device according to claim 1, wherein the resin frame ribs are arranged in line symmetry with respect to a center line extending along the long side of the liquid crystal display device.

5. The liquid crystal display device according to claim 1, wherein a top surface of the resin frame at a region free of the resin frame ribs defines a clearance with respect to a bottom surface of the top side part of the upper frame.

6. The liquid crystal display device according to claim 1, wherein the liquid crystal display panel is fixed to the top side part of the upper frame with a double-sided adhesive tape.

7. The liquid crystal display device according to claim 1, wherein the liquid crystal display panel includes a touch panel and a protective plate laminated in this order.

8. A liquid crystal display device comprising: an upper frame including a top side part having a display opening, and a lateral side part; a lower frame disposed under the upper frame and including a bottom side part and a lateral side part; a backlight retaining resin frame disposed between the upper frame and the lower frame; and a liquid crystal display panel disposed inside the resin frame, and used as a display part as incorporated in an equipment,
    wherein the liquid crystal display panel has a laminate structure where a TFT substrate having TFTs formed thereon, a CF substrate having a color filter formed thereon, a touch panel and a glass protective plate are laminated in this order, and has the CF substrate fixed by the upper frame,
    the upper frame includes a plurality of openings in the top side part thereof,
    the resin frame includes resin frame ribs protruded from the plural openings, respectively, and
    the resin frame rib includes: a receiving part to receive a fixing device for fixing the liquid crystal display device to the equipment; and
    a receiving part to receive the glass protective plate.

9. The liquid crystal display device according to claim 8, wherein the fixing-device receiving part of the resin frame rib has a width greater than a width of the receiving part for the glass protective plate.

10. The liquid crystal display device according to claim 8, wherein the resin frame ribs are arranged in line symmetry with respect to a center line extending along the long side of the liquid crystal display panel.

11. The liquid crystal display device according to claim 8, wherein a top surface of the resin frame at a region free of the resin frame ribs defines a clearance with respect to a bottom surface of the top side part of the upper frame.

12. The liquid crystal display device according to claim 8, wherein the liquid crystal display panel is fixed to the top side part of the upper frame with a double-sided adhesive tape.

* * * * *